(12) United States Patent
Rao et al.

(10) Patent No.: US 11,716,352 B2
(45) Date of Patent: Aug. 1, 2023

(54) APPLICATION PROTECTABILITY SCHEMES FOR ENTERPRISE APPLICATIONS

(71) Applicant: Cisco Technology, Inc., San Jose, CA (US)

(72) Inventors: Supreeth Rao, Cupertino, CA (US); Navindra Yadav, Cupertino, CA (US); Prasannakumar Jobigenahally Malleshaiah, Sunnyvale, CA (US); Tapan Shrikrishna Patwardhan, Mountain View, CA (US); Umamaheswaran Arumugam, San Jose, CA (US); Darshan Shrinath Purandare, Fremont, CA (US); Aiyesha Ma, San Francisco, CA (US); Fuzhuo Sun, Dublin, CA (US); Ashok Kumar, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 16/902,526

(22) Filed: Jun. 16, 2020

(65) Prior Publication Data

US 2021/0392165 A1 Dec. 16, 2021

(51) Int. Cl.
*H04L 29/06* (2006.01)
*H04L 9/40* (2022.01)

(52) U.S. Cl.
CPC .......... *H04L 63/164* (2013.01); *H04L 63/029* (2013.01); *H04L 63/20* (2013.01)

(58) Field of Classification Search
CPC ..... H04L 63/164; H04L 63/029; H04L 63/20; H04L 63/0254; H04L 63/0227; H04L 29/06986; H04L 29/06578; G06F 21/10
See application file for complete search history.

(56) References Cited

U.S. PATENT DOCUMENTS 10,318,740 B2  6/2019  Toledano et al.
2011/0289551 A1*  11/2011  Krell ............... H04L 63/10
726/1

(Continued)

FOREIGN PATENT DOCUMENTS

CN      109450893 A  *  3/2019
WO   WO 03/096168 A2    11/2003

(Continued)

OTHER PUBLICATIONS

International Search Report and Written Opinion from the International Searching Authority, dated Sep. 17, 2021, 9 pages, for corresponding International Patent Application No. PCT/US2021/037079.

(Continued)

*Primary Examiner* — William J. Goodchild
(74) *Attorney, Agent, or Firm* — Polsinelli

(57) ABSTRACT

The present disclosure relates to methods, systems, and non-transitory computer readable media for generating an application protectability index for network applications and a corresponding protectability scheme. In one aspect, a method includes identifying, by a network controller, network layers associated with an application; determining, by the network controller, a corresponding security index for the application at each of the network layers to yield a plurality of security indexes, each of the plurality of security indexes providing an objective assessment of protectability of the application at a corresponding one of the network layers; determining, by the network controller, an application protectability index; and providing an application protectability scheme for protecting the application based on the application protectability index.

20 Claims, 7 Drawing Sheets

(56) References Cited

U.S. PATENT DOCUMENTS

| | | | |
|---|---|---|---|
| 2012/0210434 A1* | 8/2012 | Curtis | H04L 63/0263 726/25 |
| 2016/0359872 A1* | 12/2016 | Yadav | H04L 63/1425 |
| 2019/0289029 A1 | 9/2019 | Chawla et al. | |
| 2020/0097662 A1 | 3/2020 | Hufsmith et al. | |
| 2020/0272973 A1* | 8/2020 | Sun | G06N 20/00 |
| 2020/0274902 A1* | 8/2020 | Gopal | H04L 63/0236 |

FOREIGN PATENT DOCUMENTS

| | | |
|---|---|---|
| WO | WO 2016/196686 A1 | 12/2016 |
| WO | 2019207486 | 10/2019 |

OTHER PUBLICATIONS

Atighetchi et al., "The Concept of Attack Surface Reasoning," Researchgate.net, Jun. 2014, pp. 1-4.

\* cited by examiner

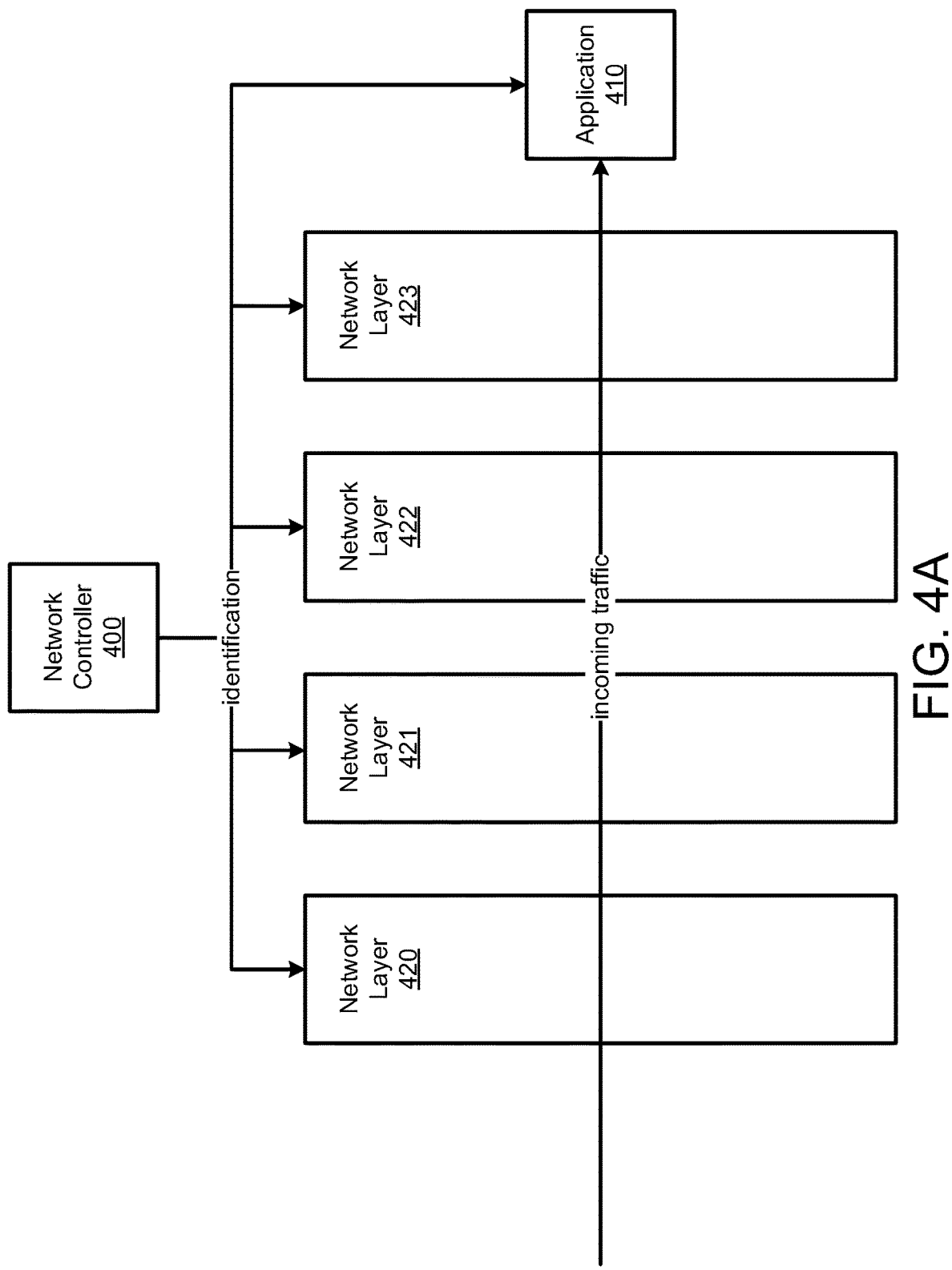

APPLICATION PROTECTABILITY SCHEMES FOR ENTERPRISE APPLICATIONS

TECHNICAL FIELD

The subject matter of this disclosure relates in general to the field of networking security, and more specifically to systems and methods of generating an application protectability index for network applications and a corresponding protectability scheme.

BACKGROUND

With the expanding complexity of networking environments, an application running on a server available on an enterprise network may be protected at various network layers, such as firewalls, containers, load balancers, etc. Currently, network monitoring systems used to monitor and manage operations and traffic within an enterprise network lack a process for providing an objective assessment of protectability of any given application at various network layers that can be used to improve the protectability thereof within the enterprise network.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which:

FIGS. 4A and 4B illustrate examples of an application security assessment system, according to one aspect of the present disclosure;

DESCRIPTION OF EXAMPLE EMBODIMENTS

Figure 1:
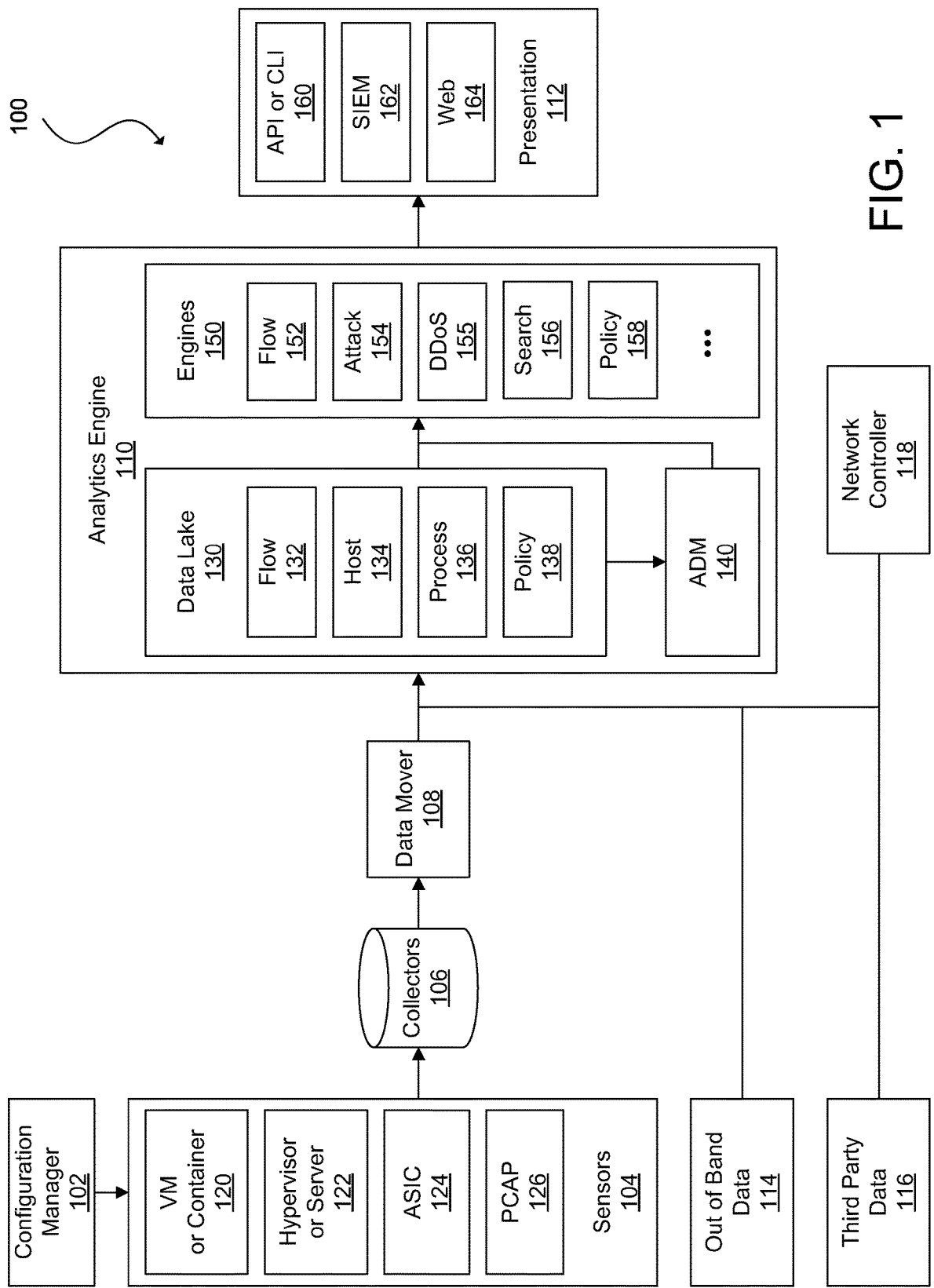
FIG. 1 illustrates an example of a network traffic monitoring system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are methods, systems, and non-transitory computer-readable storage media for generating an application protectability index for network applications and a corresponding protectability scheme. More specifically, an objective assessment of protectability of an application at any one of multiple network layers is generated, which are then used to generate an application protectability index. As will be described below, the application protectability index is used to create a protectability scheme (or replace/modify existing protectability scheme) for the corresponding application.

In one aspect, a method includes identifying, by a network controller, network layers associated with an application; determining, by the network controller, a corresponding security index for the application at each of the network layers to yield a plurality of security indexes, each of the plurality of security indexes providing an objective assessment of protectability of the application at a corresponding one of the network layers; determining, by the network controller, an application protectability index based on the plurality of security indexes; and generating an application protectability scheme for protecting the application based on the application protectability index.

In another aspect, the method for determining the corresponding security index at each of the network layers includes identifying a number of tools at a corresponding network layer available for protecting the application; assigning a corresponding weight to each of the tools; determining a corresponding protectability index factor for each of the tools; assigning a weight to the corresponding network layer; and determining the corresponding security index based on the corresponding weight of each of the tools, the corresponding protectability index factor for each of the tools and the weight of the corresponding network layer.

In another aspect, determining the corresponding security index at each of the network layers is based on a sum of all protectability indexes for the tools weighted by the corresponding weight assigned to each of the tools.

In another aspect, the corresponding weight of each of the tools is an objective indication of a level of protection provided by a corresponding one of the tools.

In another aspect, the weight of the corresponding network layer is indicative of importance of the corresponding network layer in protecting the application relative to remaining ones of the network layers.

In another aspect, the application protectability index is determined as a ratio of a sum of the plurality of security indexes to a sum of all weights assigned to the network layers.

In another aspect, the application protectability index includes at least one recommendation for improving protectability of the application.

In one aspect, a system includes at least one processor and a non-transitory computer-readable storage medium including instructions stored thereon which, when executed by the at least one processors, cause the at least one processors to identify, by a network controller, network layers associated with an application; determine, by the network controller, a corresponding security index for the application at each of the network layers to yield a plurality of security indexes, each of the plurality of security indexes providing an objective assessment of protectability of the application at a corresponding one of the network layers; determine, by the network controller, an application protectability index based on the plurality of security indexes; and generate an application protectability scheme for protecting the application based on the application protectability index.

In one aspect, a non-transitory computer-readable storage medium has stored thereon instructions which, when executed by a processor, cause the processor to identify, by a network controller, network layers associated with an application; determine, by the network controller, a corresponding security index for the application at each of the network layers to yield a plurality of security indexes, each of the plurality of security indexes providing an objective assessment of protectability of the application at a corresponding one of the network layers; determine, by the network controller, an application protectability index based on the plurality of security indexes; and generate an application protectability scheme for protecting the application based on the application protectability index.

DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

The disclosed technology addresses the need in the art for assessing application protectability and generating a scheme for application protectability. The present technology involves methods, systems, and non-transitory computer-readable media for identifying security layers, assessing the protectability of these security layers for an application, and generating protectability schemes to improve application security. More specifically, an objective assessment of protectability of an application at any one of multiple network layers is provided, which are then used to generate an application protectability Index. As will be described below, the application protectability index is used to create a protectability scheme (or replace/modify existing protectability scheme) for the corresponding application.

The present technologies will be described in more detail in the disclosure as follows. The disclosure begins with an initial discussion of systems and technologies for monitoring network activity. A description of example systems, methods, and environments for this monitoring technology will be discussed in FIGS. 1 through 3. The disclosure will then continue with a discussion of methods, systems, and non-transitory computer-readable media for identifying security layers, assessing the protectability of these security layers for an application, and generating protectability schemes to improve application security, as shown in FIGS. 4 and 5. The disclosure concludes with a description of an example computing system, described in FIG. 6, which may comprise an element of the systems shown in FIGS. 1 through 4.

The disclosure now turns to an initial discussion of example systems and technologies for monitoring network activity.

Sensors deployed in a network can be used to gather network information related to network traffic of nodes operating in the network and process information for nodes and applications running in the network. Gathered network information can be analyzed to provide insights into the operation of the nodes in the network, otherwise referred to as analytics. In particular, discovered application or inventories, application dependencies, policies, efficiencies, resource and bandwidth usage, and network flows can be determined for the network using the network traffic data. For example, an analytics engine can be configured to automate discovery of applications running in the network, map the applications' interdependencies, or generate a set of proposed network policies for implementation.

The analytics engine can monitor network information, process information, and other relevant information of traffic passing through the network using a sensor network that provides multiple perspectives for the traffic. The sensor network can include sensors for networking devices (e.g., routers, switches, network appliances), physical servers, hypervisors or shared kernels, and virtual partitions (e.g., VMs or containers), and other network elements. The analytics engine can analyze the network information, process information, and other pertinent information to determine various network insights.

Referring now to the drawings, FIG. 1 illustrates an example of a network traffic monitoring system, according to one aspect of the present disclosure. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
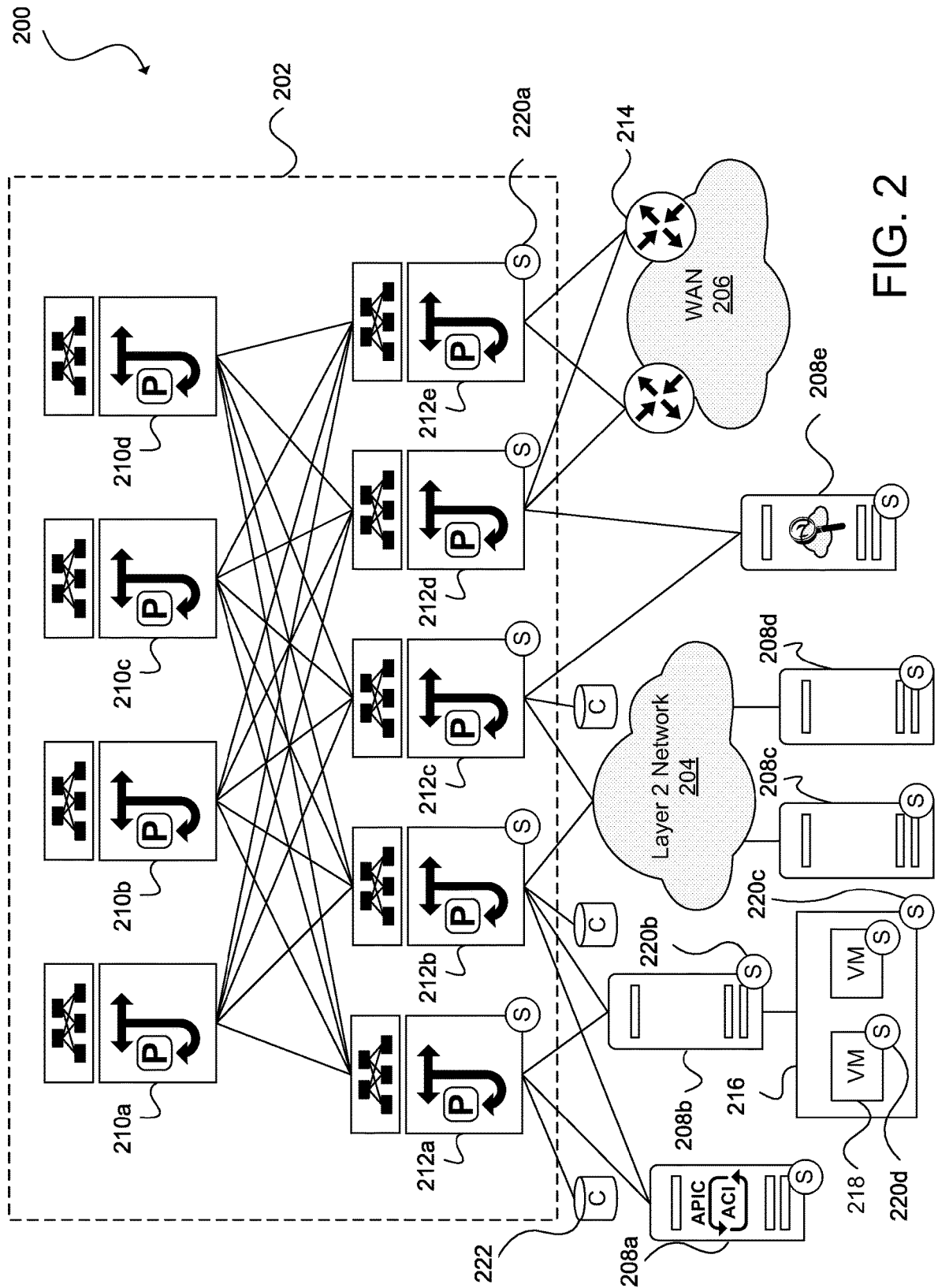
FIG. 2 illustrates an example of a network environment, according to one aspect of the present disclosure.

FIG. 2 illustrates an example of a network environment, according to one aspect of the present disclosure. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3)

network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors

220*a*, 220*b*, 220*c*, and 220*d* (collectively, "220"), collectors 222, and an analytics engine, such as the analytics engine 110 of FIG. 1, executing on the server 208*e*. The analytics engine 208*e* can receive and process network traffic data collected by the collectors 222 and detected by the sensors 220 placed on nodes located throughout the network environment 200. Although the analytics engine 208*e* is shown to be a standalone network appliance in FIG. 2, it will be appreciated that the analytics engine 208*e* can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220*a*), the hosts 208 (e.g., the sensor 220*b*), the hypervisor 216 (e.g., the sensor 220*c*), and the VMs 218 (e.g., the sensor 220*d*). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220*b*) and various components of the host (e.g., the hypervisor sensor 220*c* and the VM sensor 220*d*) so that all (or substantially all) packets traversing the network environment 200 may be monitored. For example, if one of the VMs 218 running on the host 208*b* receives a first packet from the WAN 206, the first packet may pass through the border leaf switch 212*d*, the spine switch 210*b*, the leaf switch 212*b*, the host 208*b*, the hypervisor 216, and the VM. Since all or nearly all of these components contain a respective sensor, the first packet will likely be identified and reported to one of the collectors 222. As another example, if a second packet is transmitted from one of the VMs 218 running on the host 208*b* to the host 208*d*, sensors installed along the data path, such as at the VM 218, the hypervisor 216, the host 208*b*, the leaf switch 212*b*, and the host 208*d* will likely result in capture of metadata from the second packet.

Figure 3:
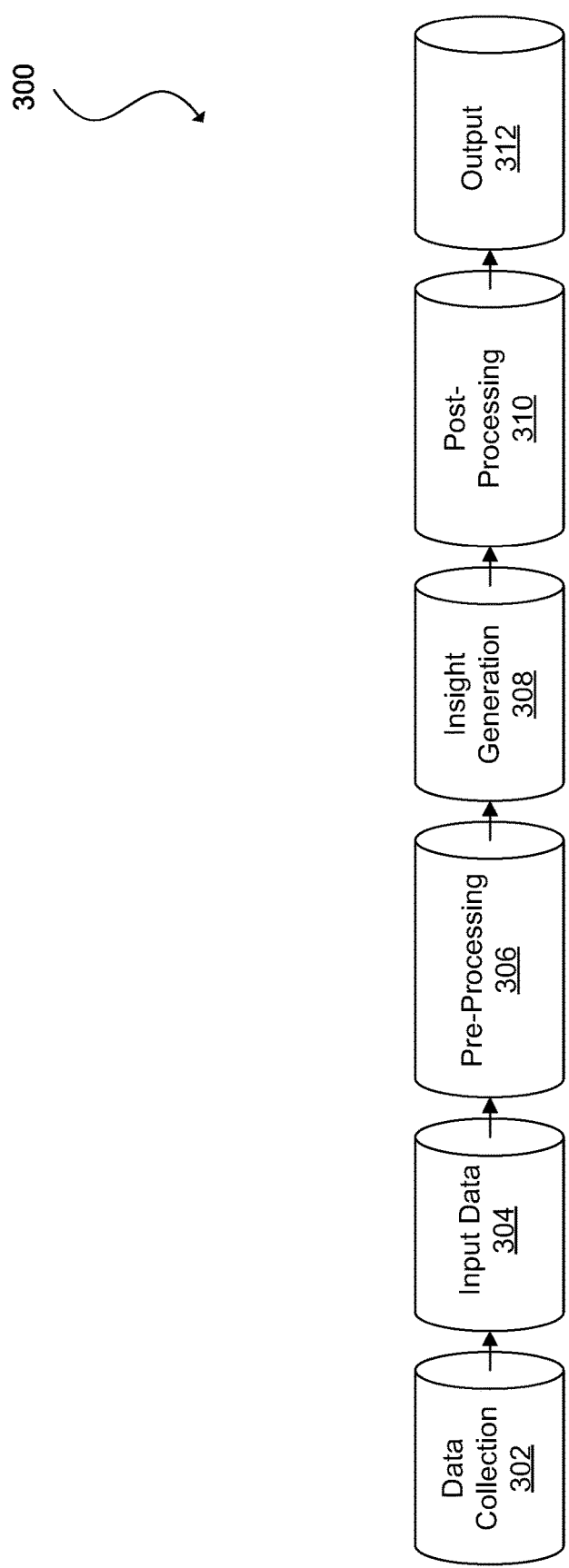
FIG. 3 illustrates an example of a data pipeline for generating network insights based on collected network information, according to one aspect of the present disclosure.

FIG. 3 illustrates an example of a data pipeline for generating network insights based on collected network information, according to one aspect of the present disclosure. The insights generated may include, for example, discovered applications or inventories, application dependencies, policies, efficiencies, resource and bandwidth usage, network flows and status of devices and/or associated users having access to the network can be determined for the network using the network traffic data. In some embodiments, the data pipeline 300 can be directed by a network traffic monitoring system, such as the network traffic monitoring system 100 of FIG. 1; an analytics engine, such as the analytics engine 110 of FIG. 1; or other network service or network appliance. For example, an analytics engine 110 can be configured to discover applications running in the network, map the applications' interdependencies, generate a set of proposed network policies for implementation, and monitor policy conformance and non-conformance among other network-related tasks.

The data pipeline 300 includes a data collection stage 302 in which network traffic data and corresponding data (e.g., host data, process data, user data, etc.) are captured by sensors (e.g., the sensors 104 of FIG. 1) located throughout the network. The data may comprise, for example, raw flow data and raw process data. As discussed, the data can be captured from multiple perspectives to provide a comprehensive view of the network. The data collected may also include other types of information, such as tenant information, virtual partition information, out-of-band information, third party information, and other relevant information. In some embodiments, the flow data and associated data can be aggregated and summarized daily or according to another suitable increment of time, and flow vectors, process vectors, host vectors, and other feature vectors can be calculated during the data collection stage 302. This can substantially reduce processing.

The data pipeline 300 may also include an input data stage 304 in which a network or security administrator or other authorized user may configure insight generation by selecting the date range of the flow data and associated data to analyze, and those nodes for which the administrator wants to analyze. In some embodiments, the administrator can also input side information, such as server load balance, route tags, and previously identified clusters during the input data stage 304. In other embodiments, the side information can be automatically pulled or another network element can push the side information.

The next stage of the data pipeline 300 is pre-processing 306. During the pre-processing stage 306, nodes of the network are partitioned into selected node and dependency node subnets. Selected nodes are those nodes for which the user requests application dependency maps and cluster information. Dependency nodes are those nodes that are not explicitly selected by the users for an ADM run but are nodes that communicate with the selected nodes. To obtain the partitioning information, edges of an application dependency map (i.e., flow data) and unprocessed feature vectors can be analyzed.

Other tasks can also be performed during the pre-processing stage 306, including identifying dependencies of the selected nodes and the dependency nodes; replacing the dependency nodes with tags based on the dependency nodes' subnet names; extracting feature vectors for the selected nodes, such as by aggregating daily vectors across multiple days, calculating term frequency-inverse document frequency (tf-idf), and normalizing the vectors (e.g., $\ell_2$ normalization); and identifying existing clusters.

In some embodiments, the pre-processing stage 306 can include early feature fusion pre-processing. Early fusion is a fusion scheme in which features are combined into a single representation. Features may be derived from various domains (e.g., network, host, virtual partition, process, user, etc.), and a feature vector in an early fusion system may represent the concatenation of disparate feature types or domains.

Early fusion may be effective for features that are similar or have a similar structure (e.g., fields of TCP and UDP packets or flows). Such features may be characterized as being a same type or being within a same domain. Early fusion may be less effective for distant features or features of different types or domains (e.g., flow-based features versus process-based features). Thus, in some embodiments, only features in the network domain (i.e., network traffic-based features, such as packet header information, number of packets for a flow, number of bytes for a flow, and similar data) may be analyzed. In other embodiments, analysis may be limited to features in the process domain (i.e., process-based features, such as process name, parent process, process owner, etc.). In yet other embodiments, feature sets in other domains (e.g., the host domain, virtual partition domain, user domain, etc.) may be the.

After pre-processing, the data pipeline 300 may proceed to an insight generation stage 308. During the insight generation stage 308, the data collected and inputted into the data pipeline 300 may be used to generate various network insights. For example, an analytics engine 110 can be configured to discover of applications running in the network, map the applications' interdependencies, generate a set of proposed network policies for implementation, and monitor policy conformance and non-conformance among other network-related tasks. Various machine learning techniques can be implemented to analyze feature vectors within a single domain or across different domains to generate insights. Machine learning is an area of computer science in which the goal is to develop models using example observations (i.e., training data), that can be used to make predictions on new observations. The models or logic are not based on theory but are empirically based or data-driven.

After clusters are identified, the data pipeline 300 can include a post-processing stage 310. The post-processing stage 310 can include tasks such as filtering insight data, converting the insight data into a consumable format, or any other preparations needed to prepare the insight data for consumption by an end user. At the output stage 312, the generated insights may be provided to an end user. The end user may be, for example a network administrator, a third-party computing system, a computing system in the network, or any other entity configured to receive the insight data. In some cases, the insight data may be configured to be displayed on a screen or provided to a system for further processing, consumption, or storage.

As noted above, a network traffic monitoring system may be configured to continually collect network data and generate various insights based on the collected network data. This network data and the insights may be updated over time and each set of network data and/or insights may provide a network snapshot or view of the state of the network for a particular period of time. The network snapshot may be generated periodically over time or in response to one or more events. Events may include, for example, a change to a network policy or configuration; an application experiencing latency that exceeds an application latency threshold; the network experiencing latency that exceeds a network latency threshold; failure of server, network device, or other network element; and similar circumstances. Various network snapshots may further be compared in order to identify changes in the state of the network over time and be used to provide additional insights into the operations of the network.

With examples of network traffic monitoring systems, their operations, and network environments in which they can be deployed described above, the disclosure now turns to FIGS. 4 and 5, which discuss assessing application protectability and generating a scheme for application protectability using the example network traffic monitoring system of FIG. 1 within the example network environment 200 of FIG. 2.

Due to the network monitoring scheme described with reference to FIGS. 1, 2, and 3, an enterprise network environment monitor can gain detailed insight into what is happening on the enterprise network environment. Data regarding device capabilities, device behavior, user identities, and other relevant information can be gathered (e.g., as part of data collection process 302 of FIG. 3) in order to identify security layers, assess the protectability of these security layers for an application, and generate protectability schemes to improve application security. Such insights can be used by a network controller such as network controller 118 of FIG. 1 to determine an objective assessment of protectability of an application at any one of multiple network layers to generate an application protectability index and subsequently generate a protectability scheme (or replace/modify existing protectability scheme) for the corresponding application, as will be further described below.

Figure 4B:
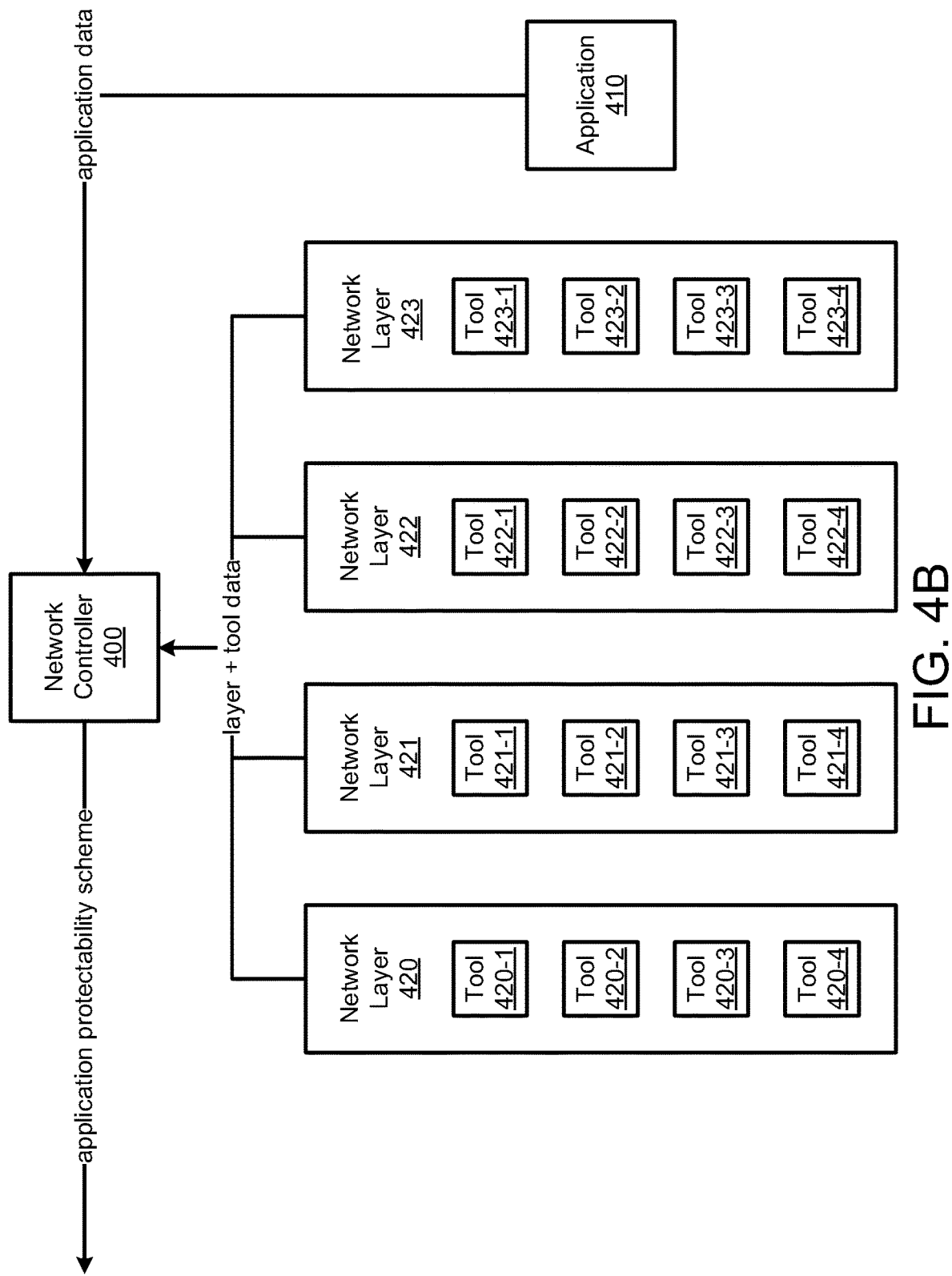
Figure 5:
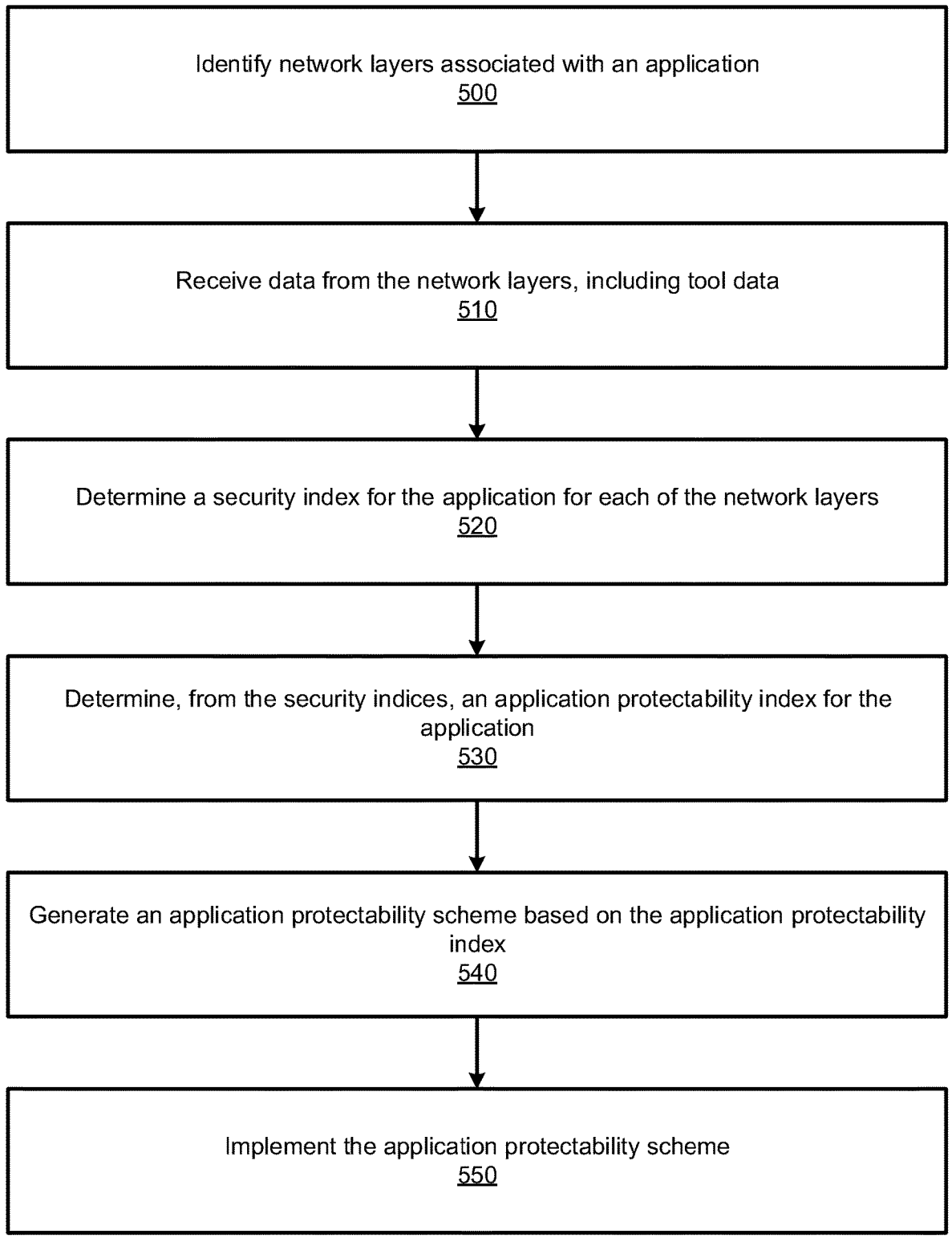
FIG. 5 illustrates an example method for determining an application protectability index, according to one aspect of the present disclosure.

FIGS. 4A and 4B illustrate examples of an application security assessment system, according to one aspect of the present disclosure. In FIG. 4A, a network controller 400 identifies network layers 420, 421, 422, and 423 which implement a protectability scheme for application 410. Network controller 400 may be the same as network controller 118 described above with reference to FIG. 1.

Network controller 400 may perform a variety of functions including orchestrating functions of an enterprise network. Such orchestration may be based on user provided inputs/instructions/commands and/or may be automatic based on monitoring of network conditions. Based on such inputs, network controller 400 can configure operations of the network. Non-limiting examples of functionalities of network controller 400 include maintaining an inventory of devices and network components in the network, along with their statuses; automating configuration and image updates for devices and network components; analyzing network operations, including identifying potential issues (performance, security, etc.) and suggesting solutions; and providing an integration platform for other services, such as reporting systems.

As another example of such non-limiting functionalities, network controller 400 can identify, for any application such as application 410, information associated with its operation/execution. For example, network controller 400 can identify network layers 420, 421, 422, and 423 associated with operation and execution of application 410. Non-limiting examples of network layers 420, 421, 422, and 423 include Kubernetes (K-8), a container, Raspberry pi (RASP), an end point agent such as any of sensors 104 of FIG. 1, a firewall, a Server Load Balancer (SLB), etc. Traffic attempting to access application 410 must pass through network layers 420, 421, 422, and 423. Each network layer 420, 421, 422, and 423 can protect application 410 in its own way by implementing correspondingly assigned network/traffic policies and controls. While FIG. 4A illustrates four non-limiting example layers, the number of layers associated with a particular application or workload is not limited to that shown in FIG. 4A and may be more or less.

In FIG. 4B, network controller 400 can receive data from application 410, network layers 420, 421, 422, 423, and the tools available at each of the network layers. Network controller 400 can process these data to yield an application protectability scheme for application 410.

Each of the layers 420, 421, 422 and 423 may have one or more corresponding tools. For example, layer 420 can have tools 420-1, 420-2, 420-3, 420-4. Layer 421 can have tools 421-1, 421-2, 421-3, 421-4. Layer 422 can have tools 422-1, 422-2, 422-3, 422-4, and layer 423 can have tools 423-1, 423-2, 423-3, and 423—(which may be collectively referred to as tools). While each layer in FIG. 4B is shown to have a total of four tools, the number of tools is not limited thereto and may be more or less.

Tools shown in FIG. 4B can be any security tool, such as firewalls, load balancers, workload protection platforms (and application segmentation), endpoint visibility platforms, container orchestration platforms, etc. Within each network layer, the tools can work together to achieve a specific goal for that network layer. For instance, network layer 420 may have tools 420-1, 420-2, 420-3, and 420-4 designed to authenticate and authorize traffic coming from outside the enterprise networking environment, while another network layer 422 may have tools 422-1, 422-2, 422-3, and 422-4 designed to protect application 410 from high traffic loads.

Once network controller 400 has data from network layers 420, 421, 422, and 423 and their tools associated with application 410, it can determine a security index for each network layer 420, 421, 422, and 423. A security index for a network layer is an objective assessment of protectability of application 410 that the network layer provides.

In some embodiments, a security index for network layer 420, 421, 422, or 423 is defined as:

$$s_l = W_l \Sigma W_{i=1}^{kl} W_{l_i} F_{l_i} \quad (1)$$

Where variables of formula (1) are defined as shown below:
$S_l$ = the security index of layer l
$W_l$ = the weight of layer l
$k_l$ = the number of tools in layer l
$W_{l_i}$ = the weight of tool i in layer l
$F_{l_i}$ = the security index factor of tool i in layer l Weights for network layers 420, 421, 422 and 423 and corresponding tools shown in FIG. 4B indicate the importance of a layer or tool for the protectability of application 410. If the enterprise networking environment hosts multiple applications 410, these weights can change for each application 410, even if the network layer and tools are the same. Such weights can depend on factors including, but not limited to, importance/criticality of a corresponding application, etc. Weights can be configurable parameters determined based on experiments and/or empirical studies.

The value of a security index factor $F_{l_i}$ in formula (1) for any given tool i (a tool i may be any one of example tools shown in FIG. 4B) in a network layer l (a layer l may be any one of example layers 420, 421, 422 and 423 shown in FIG. 4A) depends on how tool i protects application 410. It is specific to a given tool i and how it relates to application 410. In some embodiments, example security index factors for different kinds of tools can be determined as shown below:

When tool i is a firewall, such as CISCO Adaptive Security Appliance or Firepower Threat Defense, $$F_{l_i} = \frac{\sum \text{used open ports of application 410}}{\sum \text{total number of ports exposed by tool } i} \quad (2)$$

When tool i is a load balancer, such as HAProxy or NGINX, $$F_{l_i} = 1 - \frac{\sum_{j=1}^{n} \sqrt{\left(\frac{1}{n} - L_j\right)^2}}{n} \quad (3)$$

where
n = the number of servers available for application 410
Lj =
the proportion of the total load for application 410 on server j When tool i is a workload protection platform, such as CISCO Tetration, $$F_{l_i} = \frac{\text{Total traffic handled by application 410}}{\text{Total traffic hitting servers for application 410}} \quad (4)$$

When tool i is an endpoint visibility platform, such as CISCO Advanced Malware Protection, AnyConnect, or NetFlow, $$F_{l_i} = \frac{\text{Total traffic that is visible in monitoring platform}}{\text{Total traffic hitting servers for application 410}} \quad (5)$$

When tool i is a container orchestration platform, such as Kubernetes, $$F_{l_i} = \frac{\text{Total number of exposed services essential for application 410}}{\text{Total number of services exposed by the platform}} \quad (6)$$

Once network controller 400 computes a security index for each network layer 420, 421, 422, and 423 per formula (1), network controller 400 can compute an application protectability index for application 410 per formula (7) below. The application protectability index is a composite measure of how application 410 is protected at different network layers 420, 421, 422, and 423. In some embodiments, an application protectability index can be defined as $$P = \frac{\sum_{l=1}^{m} S_l}{\sum_{l=1}^{m} W_l} \quad (7)$$

Where variables of formula (7) are defined as shown below:
m = the number of layers l protecting application 410
$S_l$ = the security index of layer l
$W_l$ = the weight of layer l Once an application protectability index for the given application protectability scheme provided by network layers 420, 421, 422, and 423 is generated, network controller 400 can generate suggestions for creating and/or replacing/improving application protectability schemes for a given application such as application 410. Using information gathered from network layers 420, 421, 422, and 423 and corresponding example tools shown in FIG. 4B, network controller 400 can generate application protectability indices for alternative application protectability schemes. By comparing the existing application protectability index to potential alternatives, network controller 400 can determine which application protectability scheme would optimally protect application 410. For example, application protection using Kubernetes may lead to a higher application protectability index relative to application protection using a default networking environment firewall. If application 410 is currently protected at the firewall, then providing a recommendation to remove protectability at the firewall and replace it with protectability at KUBERNETES would be an improvement. Once an optimal or improved application protectability scheme has been determined, network controller 400 can provide this application protectability scheme to a network administrator for approval and/or other network components such as network controller 118 for implementation.

FIG. 5 illustrates an example method for determining an application protectability index, according to one aspect of the present disclosure. FIG. 5 describes a process by which network controller 400 determines an objective assessment of protectability of an application at any one of multiple network layers to generate an application protectability index and subsequently generate a protectability scheme. The process of FIG. 5 will be described from the perspective of network controller 400 described above with reference to FIGS. 4A and 4B. However, it will be understood that network controller 400 may be implemented via one or more of the components described in FIG. 1 such as network controller 118. Furthermore, FIG. 5 will be described with reference to components of FIGS. 4A and 4B.

The method begins at operation 500 when network controller 400 identifies network layers 420 associated with application 410. These network layers 420 can contain tools 430 which are used to protect application 410. At operation 510, network controller 400 receives data from network layers 420, tools 430, and application 410. This data can include the functions and capabilities of network layers 420 and tools 430, as well as data about traffic passing through network layers 420 and handled by application 410.

Once data is received, at operation 520 network controller 400 determines a security index for application 410 for each network layer 420. A security index is an objective assessment of protectability of application 410 at a network layer 420.

At operation 530, once a security index has been determined for each network layer 420, network controller 400 determines an application protectability index for application 410. The application protectability index accounts for each network layer 420 associated with application 410, and offers an overall measure of the current protectability scheme for application 410. Network controller 400 may determine the security index of each layer per the process described above with reference to FIG. 4 and formulas (1) through (7).

At operation 540, network controller 400 generates (creates) an application protectability scheme based on the determined application protectability index determined per operation 530. For example, if the application protectability index is above a given threshold network controller can determine that the existing application protectability scheme is sufficient. If the application protectability index is low, network controller 400 can determine application protectability indices for alternate application protectability schemes. It can provide such schemes to a network administrator or service for consumption.

In another example, network controller 400 may perform the process of FIG. 5 continuously and if at any given iteration, a protectability index for a particular protectability scheme is determined that is higher than a current protectability index in place for a given application, then at operation 540, the current protectability index may be replaced with the protectability index determined at that specific iteration.

In some embodiments, network controller 400 can implement the application protectability scheme generated at operation 540. This can involve choosing new network layers or tools to protect application 410, or removing network layers or tools which are currently protecting application 410. In some embodiments, network controller 400 may send the application protectability scheme to a network administrator for approval, as shown in FIG. 4B. In some embodiments, this can involve comparing the current scheme with other possible application protectability schemes, where the possible schemes are stored in a metadata/document store.

Network controller 400 can generate possible application protectability schemes with layers, and can create multiple possible application protectability schemes. Implementing a new application protectability scheme can involve adding new layers, subtracting existing layers, or modifying the implementation of existing layers. In some embodiments, implementation of the application protectability scheme can involve proposing changes to a network administrator, client, or other decision-maker, and implementing the changes after receiving approval.

As one example, an API for a given application (as determined per operation 530), which is already running a firewall and a container orchestration platform, may result in network controller 400 recommending additional protectability scheme(s) such as using an endpoint visibility platform such as CISCO Advanced Malware Protection, developed by Cisco, Inc. of San Jose, Calif. and a workload protection platform such as CICSO Tetration, developed by Cisco, Inc. of San Jose, Calif.

With systems and processes for determining an objective assessment of protectability of an application at any one of multiple network layers to generate an application protectability index, and subsequently generating an application protectability scheme based on that index, described with reference to FIGS. 4A-B and 5, the disclosure now turns to FIG. 6, which illustrates an example computing device, according to one aspect of the present disclosure.

Figure 6:
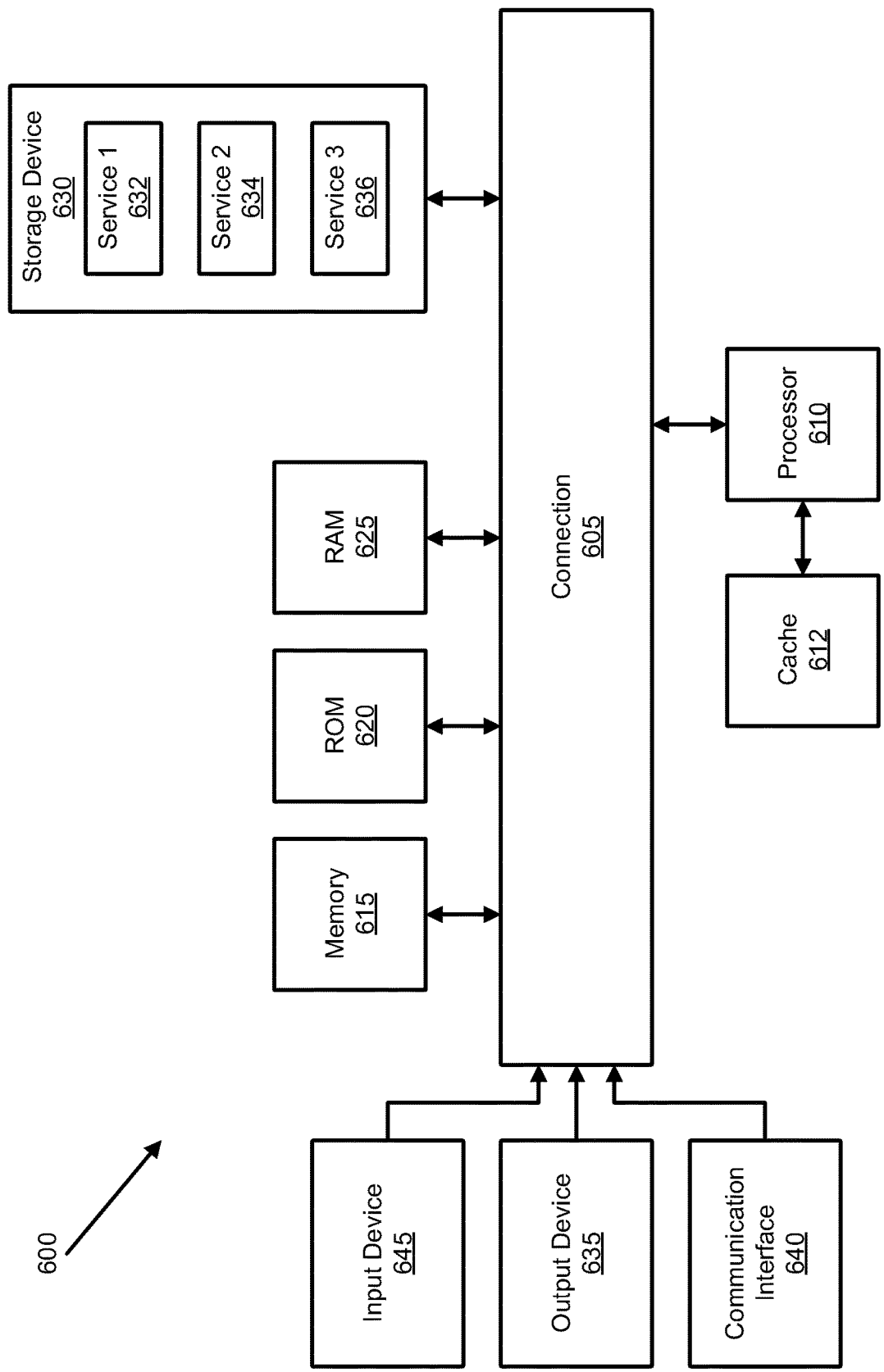
FIG. 6 illustrates an example computing system, according to one aspect of the present disclosure.

FIG. 6 shows an example of computing system 600, which can be for example any computing device making up network controller 400 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:

identifying, by a network controller, security layers for implementing an application protectability scheme for an application, wherein incoming network traffic to the application passes through each of the security layers and each of the security layers implements one or more security tools for a specific goal of protecting the application from the incoming network traffic;

determining, for each security layer, a set of security tools that work interdependently as an independent network layer to achieve a specific goal for the security layer, such that a first set of tools for a first security layer applies to incoming traffic to achieve a first goal and a second set of tools for a second security layer applies to the same incoming traffic to achieve a second goal;

determining, by the network controller, a corresponding security index for the application at each of the security layers to yield a plurality of security indexes, each of the plurality of security indexes providing an objective assessment of protectability of the application at a corresponding one of the security layers;

determining, by the network controller, an application protectability index based on the plurality of security indexes;

generating the application protectability scheme for protecting the application based on the application protectability index; and providing a comparison of security effectiveness between each of the security layers based on the application protectability scheme, wherein the application protectability index determines which security layer provides optimal protection for the application.

2. The method of claim 1, wherein determining the corresponding security index at each of the security layers comprises:

identifying the one or more security tools at a corresponding security layer available for protecting the application;

assigning a corresponding weight to each of the one or more security tools;

determining a corresponding protectability index factor for each of the one or more security tools;

assigning a weight to the corresponding security layer; and determining the corresponding security index based on the corresponding weight of each of the one or more security tools, the corresponding protectability index factor for each of the one or more security tools and the weight of the corresponding security layer.

3. The method of claim 2, wherein determining the corresponding security index at each of the security layers is based on a sum of all protectability indexes for the one or more security tools weighted by the corresponding weight assigned to each of the one or more security tools.

4. The method of claim 2, wherein the corresponding weight of each of the one or more security tools is an objective indication of a level of protection provided by a corresponding one of the one or more security tools.

5. The method of claim 2, wherein the weight of the corresponding security layer is indicative of importance of the corresponding security layer in protecting the application relative to remaining ones of the security layers.

6. The method of claim 2, wherein the application protectability index is determined as a ratio of a sum of the plurality of security indexes to a sum of all weights assigned to the security layers.

7. The method of claim 1, wherein the application protectability index includes at least one recommendation for improving protectability of the application.

8. A system comprising:
at least one processor; and
a non-transitory computer-readable storage medium comprising instructions stored thereon which, when executed by the at least one processor, cause the at least one processors to:
identify, by a network controller, security layers for implementing an application protectability scheme for an application, wherein incoming network traffic to the application passes through each of the security layers and each of the security layers implements one or more security tools for a specific goal of protecting the application from the incoming network traffic;
determine, for each security layer, a set of security tools that work interdependently as an independent network layer to achieve a specific goal for the security layer, such that a first set of tools for a first security layer applies to incoming traffic to achieve a first goal and a second set of tools for a second security layer applies to the same incoming traffic to achieve a second goal;
determine, by the network controller, a corresponding security index for the application at each of the security layers to yield a plurality of security indexes, each of the plurality of security indexes providing an objective assessment of protectability of the application at a corresponding one of the security layers;
determine, by the network controller, an application protectability index based on the plurality of security indexes;
generate the application protectability scheme for protecting the application based on the application protectability index; and
provide a comparison of security effectiveness between each of the security layers based on the application protectability scheme, wherein the application protectability index determines which security layer provides optimal protection for the application.

9. The system of claim 8, wherein the at least one processors is configured to execute the instructions to:
identify of the one or more security tools at a corresponding network layer available for protecting the application;
assign a corresponding weight to each of the one or more security tools;
determine a corresponding protectability index factor for each of the one or more security tools;
assign a weight to the corresponding security layer; and
determine the corresponding security index based on the corresponding weight of each of the one or more security tools, the corresponding protectability index factor for each of the one or more security tools and the weight of the corresponding security layer.

10. The system of claim 9, wherein determining the corresponding security index at each of the security layers is based on a sum of all protectability indexes for the one or more security tools weighted by the corresponding weight assigned to each of the one or more security tools.

11. The system of claim 9, wherein the corresponding weight of each of the one or more security tools is an objective indication of a level of protection provided by a corresponding one of the one or more security tools.

12. The system of claim 9, wherein the weight of the corresponding security layer is indicative of importance of the corresponding security layer in protecting the application relative to remaining ones of the security layers.

13. The system of claim 9, wherein the application protectability index is determined as a ratio of a sum of the plurality of security indexes to a sum of all weights assigned to the security layers.

14. The system of claim 8, wherein the application protectability index includes at least one recommendation for improving protectability of the application.

15. A non-transitory computer-readable storage medium comprising computer-readable instructions stored thereon which, when executed by at least one processor, cause the at least one processor to:
identify, by a network controller, security layers for implementing an application protectability scheme for an application, wherein incoming network traffic to the application passes through each of the security layers and each of the security layers implements one or more security tools for a specific goal of protecting the application from the incoming network traffic;
determine, for each security layer, a set of security tools that work interdependently as an independent network layer to achieve a specific goal for the security layer, such that a first set of tools for a first security layer applies to incoming traffic to achieve a first goal and a second set of tools for a second security layer applies to the same incoming traffic to achieve a second goal;
determine, by the network controller, a corresponding security index for the application at each of the security layers to yield a plurality of security indexes, each of the plurality of security indexes providing an objective assessment of protectability of the application at a corresponding one of the security layers;
determine, by the network controller, an application protectability index based on the plurality of security indexes;
generate the application protectability scheme for protecting the application based on the application protectability index; and
provide a comparison of security effectiveness between each of the security layers based on the application protectability scheme, wherein the application protectability index determines which security layer provides optimal protection for the application.

16. The non-transitory computer-readable storage medium of claim 15, wherein the execution of the computer-readable instructions by the at least one processor, further cause the at least one processor to:
- identify the one or more security tools at a corresponding security layer available for protecting the application;
- assign a corresponding weight to each of the one or more security tools;
- determine a corresponding protectability index factor for each of the one or more security tools;
- assign a weight to the corresponding security layer; and
- determine the corresponding security index based on the corresponding weight of each of the one or more security tools, the corresponding protectability index factor for each of the one or more security tools and the weight of the corresponding security layer.

17. The non-transitory computer-readable storage medium of claim 16, wherein determining the corresponding security index at each of the security layers is based on a sum of all protectability indexes for the one or more security tools weighted by the corresponding weight assigned to each of the one or more security tools.

18. The non-transitory computer-readable storage medium of claim 16, wherein the corresponding weight of each of the one or more security tools is an objective indication of a level of protection provided by a corresponding one of the one or more security tools.

19. The non-transitory computer-readable storage medium of claim 16, wherein the weight of the corresponding security layer is indicative of importance of the corresponding security layer in protecting the application relative to remaining ones of the security layers.

20. The non-transitory computer-readable storage medium of claim 15, wherein the application protectability index is determined as a ratio of a sum of the plurality of security indexes to a sum of all weights assigned to the security layers.

* * * * *